April 4, 1939.　　　M. A. MARTIN　　　2,153,335
REFRIGERATING UNIT
Filed Feb. 11, 1937　　3 Sheets-Sheet 1

INVENTOR.
MICHAEL A. MARTIN
BY
His ATTORNEYS.

April 4, 1939.   M. A. MARTIN   2,153,335
REFRIGERATING UNIT
Filed Feb. 11, 1937   3 Sheets-Sheet 2

INVENTOR.
MICHAEL A. MARTIN
BY Stough and Caufield
His ATTORNEYS.

April 4, 1939.  M. A. MARTIN  2,153,335
REFRIGERATING UNIT
Filed Feb. 11, 1937  3 Sheets-Sheet 3

INVENTOR.
MICHAEL A. MARTIN
BY Slough and Canfield
His ATTORNEYS.

Patented Apr. 4, 1939

2,153,335

UNITED STATES PATENT OFFICE 2,153,335

REFRIGERATING UNIT

Michael A. Martin, Erie, Pa.

Application February 11, 1937, Serial No. 125,240

5 Claims. (Cl. 225—40)

This invention relates to refrigerating systems, and more particularly to refrigerating systems for beverages such as beer.

It is customary to have the beverage container such as a beer barrel disposed in the cellar and the dispensing apparatus such as the dispenser disposed on the first floor of a structure. The dispenser or coil box usually comprises a heat insulated cabinet having coils or similar means through which the beer flows under pressure from the barrel, a brine or the like liquid solution within which the coils are immersed, and an evaporator unit through which a refrigerant medium flows to absorb heat from and cool the brine solution. The cooling effect on beverage or beer passing through the coils is largely determined by the volume of the brine or the like liquid solution and the temperature to which it can be lowered by the evaporator.

A beverage such as beer should be delivered for consumption within definite temperature limits to be most palatable, too high a temperature resulting in a flat taste and too low a temperature resulting in a collarless beer. A temperature range of 40° to 42° Fahrenheit is usually considered the most desirable temperature. Although beer contains alcohol, it will freeze at temperatures somewhat lower than the freezing point of water and consequently, the temperature of the brine solution must be maintained above a predetermined low value. Due to the limited space at the point where the beer is dispensed, it is impractical to have an exceptionally large dispenser and the average dispenser has a capacity of 15 to 30 gallons of brine solution or a similar heat exchange liquid. This fact together with the low temperature limitation causes a definite heat exchange capacity at the beverage temperature desired and when a considerable quantity of beer is drawn in a short period, beer is delivered which is not sufficiently cooled.

I have devised a system and apparatus whereby the heat exchange capacity of the dispenser is greatly increased without enlarging the same thereby permitting beer to be dispensed rapidly over a long period while maintaining the beverage temperature at a desired point.

It is a primary object of my invention to provide a refrigerant system for beer or the like dispensing apparatus permitting a considerable quantity of beer to be substantially continuously drawn over a long period while maintaining the beer temperature below a predetermined value.

Another object of my invention is to increase the heat exchange capacity of a beverage dispenser of a given size thereby enabling a greater quantity of beverage to be drawn in a given period while maintaining the beverage temperature below a predetermined value.

Another object of my invention is to provide a supplemental means adapted to a conventional beverage dispenser disposed at a remote point increasing the heat exchange capacity for cooling liquid within the dispenser and reducing peak loads on the refrigerant system compressor unit.

Another object of my invention is to provide a unit adapted to a beverage cooling system including a dispenser and beverage containers at a remote point wherein the containers will be maintained below a predetermined temperature and the dispenser will concurrently be maintained below a different predetermined temperature.

Another object of my invention is to provide a beverage cooling system including a dispenser wherein the beer is maintained cool up to the point of withdrawal from the dispenser.

Another object of my invention is to provide heat exchange means adapted to a battery of beverage dispensers.

Other objects of my invention and the invention itself will become increasingly apparent from a consideration of the following description and drawings wherein.

Figure 1:
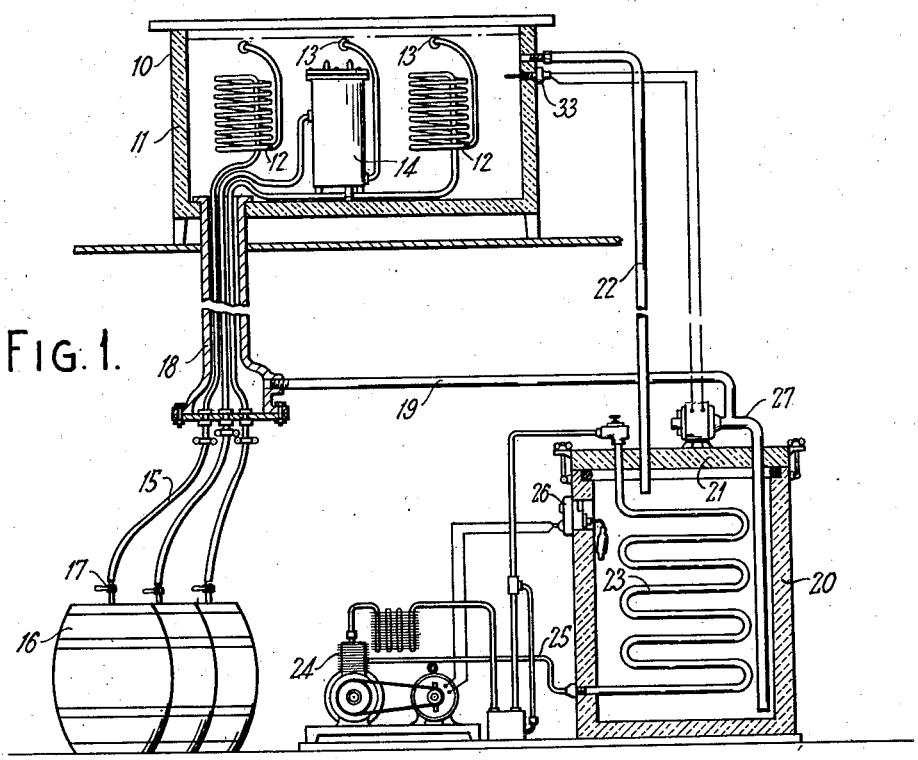
Fig. 1 is a diagrammatic view of a preferred embodiment of my invention.

Referring now to the drawings, I have indicated generally at 10 a conventional dispenser mounted in a convenient location for the dispensing of beverages such as beer and comprising a heat insulated cabinet 11 adapted to be substantially filled with a cooling liquid such as brine. Immersed in the cooling liquid are a plurality of coils 12 through which the beverage passes to dispensing nozzles 13. I also show at 14 a beverage container of drum form since I contemplate that any suitable type beverage container may be employed in the dispenser. It will be noted that the liquid level of the cooling brine or the like is above the nozzle 13 whereby the beverage is maintained properly cooled up to the point of withdrawal.

The coils 12 and container 14 are connected by conduits 15 with containers 16 for supplying beer or the like under pressure to the dispenser. The usual valve arrangement 17 is provided in each conduit utilized when cleaning the coils and conduits or when replacing an empty container with a filled one. The conduits 15 pass through a relatively large heat insulated pipe 18 which also forms part of the supply line for brine or similar cooling solution to the dispenser.

The conduits 15 are preferably heat insulated externally of pipe 18 and it will be noted that they are gradually curved or substantially straight permitting ease in cleaning.

A lateral port in pipe 18 is connected with a supply line 19 leading to a heat insulated cabinet 20. Cabinet 20 is of generally box-shape and is provided with a perforated removable cover 21 adapted to be sealingly secured thereto.

The supply line 19 is projected within cabinet 20 and terminates adjacent the base thereof and a return line 22 is provided preferably connected to the dispenser adjacent the top and projected through the cover 21 of cabinet 20. The cabinet 20 and dispenser 10 are thus interconnected by conduits for the cooling brine or similar cooling liquid.

The cabinet 20 contains an evaporator generally indicated at 23 which may be of any suitable type adapted to lower the temperature of the cooling liquid and as illustrated comprises a compressor unit 24 having a conduit leading therefrom to the usual condenser, liquid receiver, and expansion valve, and then through the evaporator 23 and through a return conduit 25 to the compressor unit. The operation of the compressor may be controlled responsive to the temperature of the cooling liquid within the cabinet 20 in a well known manner as by the use of a thermostatic switch 26. Although I have illustrated a thermostatic switch 26 responsive to cooling liquid temperature. I contemplate that this may be dispensed with and that a conventional automatic pressure control in the refrigerant conduit system may be employed to control evaporator temperature.

Thus, the temperature of the cooling liquid within the cabinet 20 may always be maintained within desired temperature limits since at a predetermined high temperature, the thermostatic switch will cut the compressor into operation and upon a drop in temperature to a predetermined value the compressor will be cut out of operation.

Figure 3:
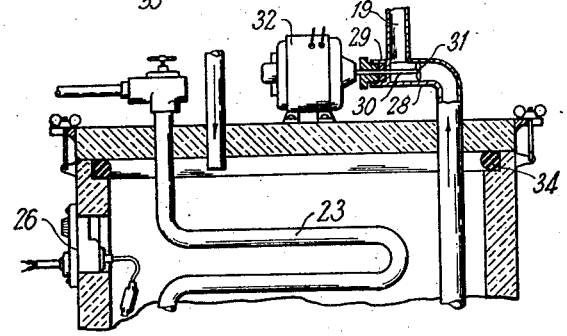
Fig. 3 is a sectional elevational view of a unit which I may employ in the modification of Figs. 1 and 2.

The means of effecting circulation of the cooling liquid through dispenser 10 and cabinet 20 will now be described. A circulating unit 27 generally similar to that described in my copending application, Serial No. 4,911, filed September 24, 1935, is mounted on the cover 21 of cabinet 20. The mounting of this unit is best illustrated in Fig. 3 wherein it will be noted that supply line 19 is provided with a right angle bend at the cover forming a horizontally extending portion 28 having an axially aligned opening 29 through which is sealingly projected a shaft 30 having an impeller 31 mounted thereon, the shaft 30 being operable by an electric motor 32. Motor 32 may be controlled by a thermostatic switch 33 whereby circulation will be initiated when a predetermined high temperature is attained and discontinued upon a drop in temperature to a predetermined value. Although I have shown the bulb portion of the thermostatic switch, as contacting the cooling liquid in the dispenser, I contemplate that it may contact any portion of the return line 22 instead.

Both the supply line 19 and return line 22 are preferably heat insulated and the cover 21 is easily removable permitting access to the cabinet interior when desired.

In a similar manner, the conduit connections for the evaporator 23 are projected through the cover 21 and I preferably provide means for disconnecting the various conduits externally of the cover and adjacent thereto. In order to insure a tight seal of the cover with the cabinet, a rubber or the like sealing gasket 34 is seated within a recess provided at the cabinet top to effect a resilient seal with the cover in a secured position.

The pipe 18 which as previously stated is heat insulated is relatively large and sealed at its base through which the beverage conduits 15 are projected whereby the cooling liquid flowing through supply line 19 will immerse the portion of conduits 15 within pipe 18 and cool the beverage prior to entering the dispenser.

The capacity of cabinet 20 is preferably considerably greater than that of dispenser 10 and the temperature of the cooling fluid in cabinet 20 may be maintained at a substantially lower temperature than that desired in dispenser 10 which must be maintained above a predetermined low temperature to prevent freezing of the beer. Thus, the temperature of cabinet 20 may be 20° Fahrenheit and due to the large volume of cooling liquid at this temperature in the cabinet, the temperature of the cooling liquid in the dispenser may be rapidly reduced or maintained at a desired temperature despite the passage of a considerable quantity of beer through the coils 12 and/or container 14 and for a relatively long period. The provision of a large reservoir for cooling liquid at substantially lower temperature not only permits the use of a relatively small dispenser at the point of dispensing beverage where space is limited but provides a more economical system since a small compressor running substantially continuously can be employed instead of a large compressor of a capacity necessary to maintain the dispenser cooling liquid at a desired temperature value with the consequent inefficiency of intermittent starting and stopping of the compressor motor. Additionally, irrespective of the size of the compressor, the cooling effect on the beer or beverage is limited by the capacity of the relatively small volume of cooling liquid or brine within the dispenser to absorb and give up heat and I have found that under peak loads or when beer is being rapidly withdrawn for a considerable period that it is impossible for a conventional size dispenser such as 20 gallon capacity of cooling brine to maintain withdrawn beer at a desired temperature such as 42° Fahrenheit or below.

Figure 4:
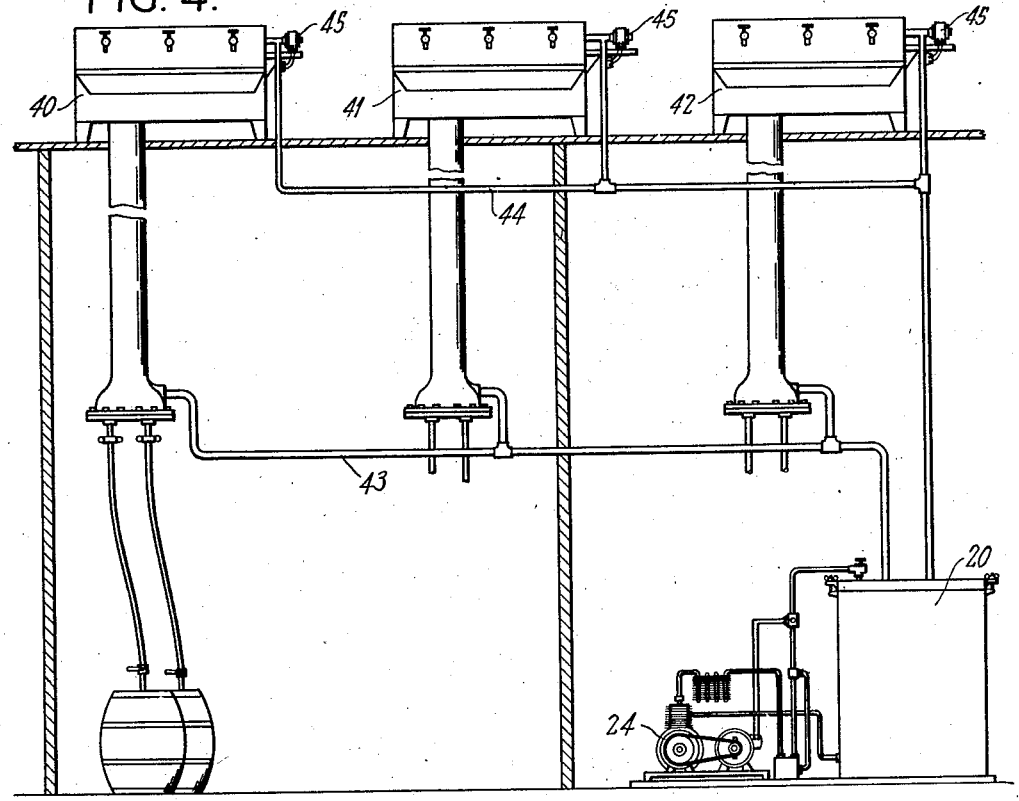
Fig. 4 is a diagrammatic view of a further modification of my invention.

Referring now to Fig. 4 I have shown an arrangement generally similar to that illustrated in Fig. 1 but wherein the cabinet 20 supplies a battery of dispensers indicated at 40, 41 and 42. It will be understood that under certain conditions it is desirable to have several dispensers of a given capacity at spaced points and the heat exchange demands on the cooling liquid in each dispenser will vary. I provide a common supply line 43 to each of the dispensers and also a common return line to the cabinet 20 from each dispenser as indicated at 44. In this instance, I provide an individual circulator unit for each dispenser as indicated at 45 whereby the circulation of cooling liquid through each dispenser may be independently controlled. The circulator unit is similar to that described in connection with Fig. 3 and is thermostatically controlled dependent on the temperature of the cooling liquid within its associated dispenser. For example, if a relatively greater amount of beverage is being drawn through the coils in dispenser 40, the temperature of the cooling liquid will be raised whereupon the circulator will be operated to draw cooling liquid from cabinet 20 through the supply line 43 and returned through line 44 but this will not influence the circulation of cooling liquid through dispensers 41 and 42 since the liquid therein is in a static condition. In like manner, if two of the circulating units 45 are in operation circulation of cooling liquid through two dispensers may be effected while the third dispenser has the cooling liquid maintained in a static condition. Also, all three dispensers may have circulation of cooling liquid therethrough, the circulation in each dispenser being under the control of its associated circulator unit.

Figure 2:
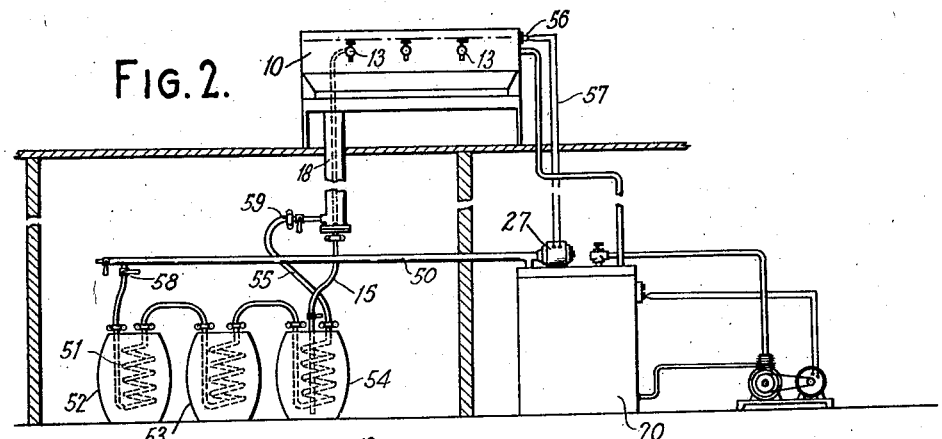
Fig. 2 is a diagrammatic view of a modification of my invention.

Referring now to Fig. 2. I have shown an arrangement somewhat similar to that illustrated in Fig. 1 but wherein the beverage is pre-cooled in the container or barrel prior to entering the dispenser thereby eliminating the necessity for coils or the like within the dispenser.

The dispenser 10 has the pipe 18 mounted in the base thereof as previously described and the conduits 15 as projected therethrough and directly connected with nozzles 13 rather than passing through coils 12 or drum 14 as in the modification of Fig. 1. I have illustrated only one barrel connected with the dispenser but any desired number may be connected therewith. The elimination of coils or drums in the dispenser permits the conduit 15 to be easily cleaned by a brush or the like rather than by a liquid cleaning agent which is less satisfactory and also enlarges the cooling liquid capacity for a given size dispenser.

The cabinet 20 has a supply pipe 50 leading therefrom which provides cooling liquid for coils 51 disposed in a barrel 52 and after passing through the coils the cooling liquid traverses similar coils in barrels 53 and 54. Then the cooling liquid passes into pipe 18 by means of a preferably flexible conduit 55 and subsequently to the dispenser 10. Thus, the beer is pre-cooled in the barrels prior to reaching the dispenser and is maintained cool during passage to the dispenser by insulating the portion of conduit 15 externally of pipe 18 and immersing the portion of conduit 15 within pipe 18 in cooling liquid.

The necessity for coils or drums within the dispenser is eliminated and in the event that the supply of cooling liquid is stopped for any reason the dispenser can be filled with ice due to the extra available space.

The circulator unit 27 forces the cooling liquid through the conduit system described and is operably responsive to the temperature of cooling liquid in the dispenser under control of a thermostatic switch 56. A return conduit 57 from the dispenser to cabinet 20 completes the circulatory system for the cooling liquid.

The barrels are preferably supplied with the coils mounted therein upon delivery from the brewery and valves 58 and 59 block the flow of cooling liquid when a fresh barrel is being connected.

Figure 5:
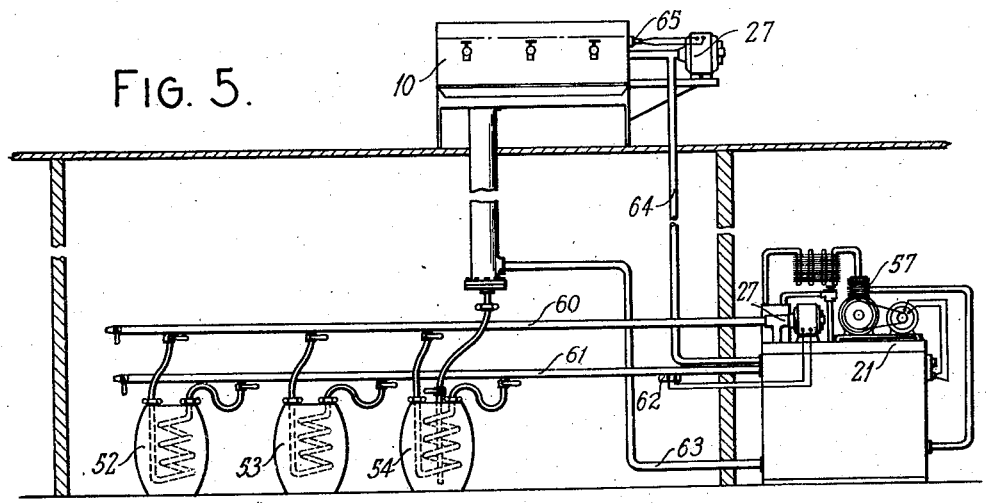
Fig. 5 is a view generally similar to Fig. 2 but wherein the compressor unit is mounted on the tank and the barrels and dispenser are independently cooled.

Referring to Fig. 5, I have illustrated a modification of my invention generally similar to Fig. 2 but the compressor unit generally indicated at 57 is mounted on the cabinet cover 21 together with two circulator units 27. The barrels 52, 53 and 54 are cooled independently of the dispenser 10 by means of a supply line 60 for cooling water and a return line 61. The circulator unit 27 effecting flow of cooling liquid through the barrels is operably responsive to the temperature of cooling liquid in return line 61 and is controlled by a conventional thermo-switch 62.

A supply line 63 transmits cooling liquid to the dispenser 10 and a line 64 returns liquid to cabinet 20. A second circulator unit 27 controlled by a similar thermo-switch 65 responsive to the temperature of liquid in dispenser 10 effects circulation through the dispenser.

The temperature of the beer in the containers is preferably kept lower than that in the dispenser to minimize the heat exchange and load on the dispenser and this can be controlled due to the two independent circulating systems for the cooling liquid.

Figure 6:
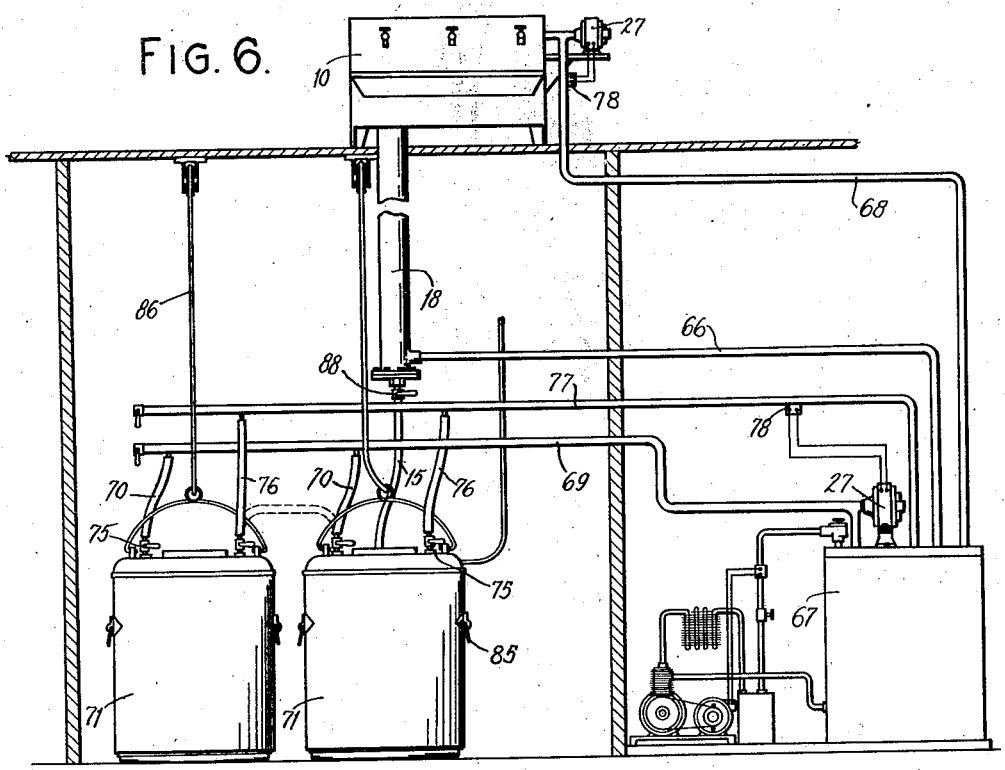
Fig. 6 is an elevational view mainly diagrammatic of a further modification.
Figures 7, 8:
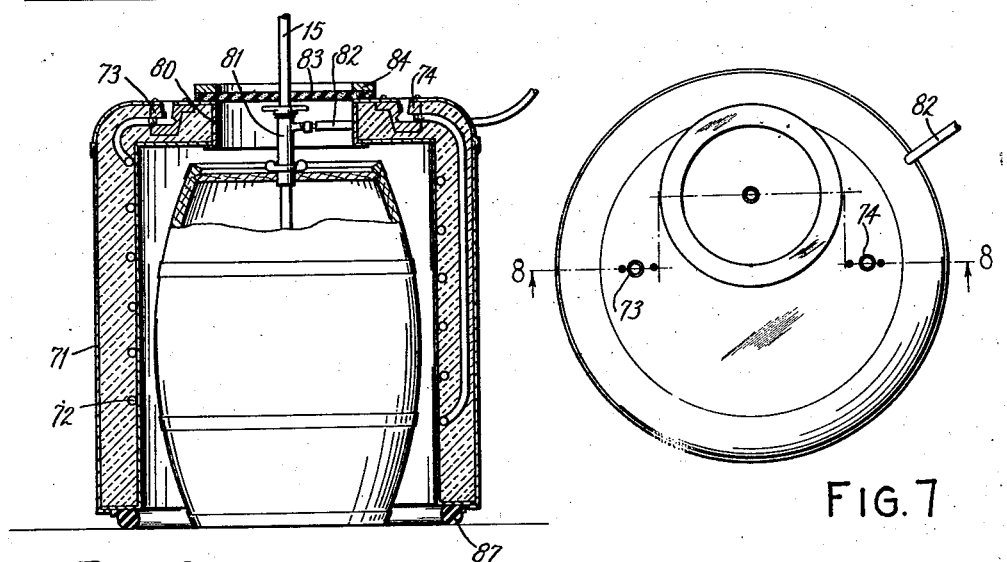
Fig. 7 is a plan view of a broad arrangement for barrels employed in the modification of Fig. 6
Fig. 8 is a section along line 8—8 of Fig. 7.

Referring to Figs. 6, 7 and 8, I have shown an arrangement similar to Fig. 5 wherein two independent systems for circulating cooling liquid to the dispenser and for cooling the beverage containers are provided. The dispenser system comprises a supply line 66 leading from the cooling cabinet 67 to pipe 18 and a return line 68 from the dispenser to the cabinet, the flow of cooling liquid being under the control of circulator 27 responsive to the dispenser temperature.

The cooling system for the beverage containers comprises a supply line 69 having flexible conduits such as rubber indicated at 70—70 leading therefrom to generally cylindrical hoods 71—71. The hoods 71 are formed of heat insulating material and are generally of inverted cup-form. The hoods preferably comprise spaced inner and outer sheet metal shells having suitable filler material therebetween such as glass wool. A spiral conduit coil 72 encircles the inner shell and has its opposite ends sealingly projected within resilient plugs such as rubber disposed in the hood top and indicated at 73 and 74. The plug 73 is adapted to receive the free end of conduit 70 which includes a valve 75, a portion of the valve being of frusto-conical form to compressively engage a similarly formed recess provided in plug 73. Thus, the conduit 70 can quickly be connected to or disconnected from the coil 72. The valve 75 is manipulated to shut off the flow of cooling liquid when disconnecting conduit 70.

In a similar manner flexible conduits 76—76 are sealingly connected to plugs 74 which are secured to a return line 77 leading back to cabinet 67. A thermostatic switch 78 is associated with return line 77 and controls operation of a circulator 27 mounted on the cabinet to effect cooling liquid flow through hoods 71 when a predetermined high temperature of the cooling liquid occurs.

The top of each hood is provided with a generally circular opening indicated at 80 to permit a conventional fixture 81 associated with the beer barrel to be connected with the beer withdrawal conduit 15 and also a gas pressure line 82. The opening 80 is sealingly closed by a rubber or the like pad 83 maintained in place by a metal ring 84. Pad 83 is centrally perforated to slidingly engage beverage conduit 15 whereby the pad may be raised permitting the connections with fixture 81 to be effected.

The hoods 71 may be raised in any suitable manner as by handles 85 or a tackle arrangement 86 secured to the hoods. After a barrel is emptied pad 83 is raised and the fixture 81 disconnected. The hood is then raised permitting the empty barrel to be withdrawn and I contemplate that due to the flexibility of conduits 70 and 76 it will not be necessary to disconnect them from the hood during this operation. A new barrel is disposed under the hood and the hood lowered to rest upon a gasket 87 associated therewith and effecting a sealing contact with the floor. A valve 88 associated with beverage conduit 15 prevents reverse flow of beverage when replacing a barrel other than a small amount in the portion of conduit 15 beneath the valve.

Although I have shown and described modifications of my invention I contemplate that numerous and extensive departures may be made therefrom without departing from the spirit of my invention and the scope of the appended claims.

Having thus described my invention, what I claim is:

1. The combination with a beverage dispenser adapted to contain a cooling liquid, a beverage container disposed at a point remote from the dispenser and a beverage supply line extending from the container to the dispenser, of a closed tank containing a relatively large supply of cooling liquid, mechanical refrigerating means for cooling the liquid in the tank, means controlling operation of the refrigerating means responsive to the temperature of the cooling liquid in the tank, a relatively large conduit extending a substantial distance from the dispenser in encircling relation to the beverage supply line, the conduit opening into the dispenser at one end and at its opposite end being closed to sealingly engage the beverage supply line, a cooling liquid supply connection extending from the tank and joining the conduit adjacent the closed end thereof, a return cooling liquid connection extending from the dispenser to the tank, whereby a closed cooling liquid circuit is effected including the dispenser, the tank and the conduit, intermittently operable pump means for forcing relatively cold cooling liquid from the tank through the conduit and to the dispenser responsive to the temperature of cooling liquid in the dispenser, and the cold liquid from the tank pre-cooling the warm beverage from the container passing through the conduit prior to said beverage entering the dispenser.

2. The combination with a beverage dispenser adapted to contain a cooling liquid, a beverage container disposed at a point remote from the dispenser, and a beverage supply line extending from the container to the dispenser, of a closed heat insulated tank containing cooling liquid, heat exchange means for cooling the liquid in the tank, adjustable control means for the heat exchange means responsive to the temperature of the cooling liquid in the tank, a relatively large conduit extending from the dispenser and having a closed outer end, the beverage supply line being sealingly projected through the conduit end and encircled by the conduit, a supply connection from the tank to the conduit adjacent the closed end thereof, a return connection from the dispenser to the tank whereby a closed circuit for cooling liquid is effected including the tank, the supply line, the conduit, the dispenser and the return line, and pump means operably responsive to the temperature of the cooling liquid in the dispenser for supplying relatively cold liquid from the tank through the conduit to the dispenser.

3. The combination with a beverage dispenser, a beverage container at a point remote from the dispenser, and a beverage supply line extending from the container to the dispenser, of means for pre-cooling the beverage prior to entering the dispenser and for cooling beverage within the dispenser comprising a relatively large supply of cooling liquid, cooling liquid supply and return means extending from the supply to the dispenser, the supply means including a conduit sealingly encircling the beverage supply line for a substantial distance, heat exchange means for maintaining the temperature of the supply below a pre-determined value, means controlling the heat exchange means responsive to the temperature of the cooling liquid supply, and pump means responsive to the temperature of cooling liquid in the dispenser, whereby a substantial temperature differential may be maintained between the cooling liquid at the supply and in the dispenser.

4. The combination with a beverage dispenser, a beverage container at a point remote from the dispenser, and a beverage supply line extending from the container to the dispenser, of a closed tank containing a relatively large supply of cooling liquid, heat exchange means for cooling the liquid in the tank, control means for the heat exchange means responsive to the temperature of cooling liquid in the tank, a relatively large conduit extending from the dispenser and having a sealed outer end, the beverage supply line being sealingly projected through the conduit and encircled thereby for a substantial distance, a cooling liquid supply connection from the tank joining the conduit adjacent the outer end thereof, a cooling liquid return connection from the dispenser to the tank whereby a closed circuit for cooling liquid is effected including the tank, the supply line, the conduit, the dispenser and return line, and pump means responsive to the temperature of relatively warm cooling liquid at a point in said circuit remote from the tank for supplying cooling liquid from the tank to the dispenser.

5. The method of maintaining drawn beverage supplied from a remote point to a liquid cooled dispenser within narrow temperature limits, which includes providing a large reserve supply of cooling liquid maintained at a temperature substantially lower than the beverage withdrawal temperature and at a point remote from the dispenser, intermittently pumping relatively cold liquid from the supply to the dispenser in correspondence with the heat exchange between beverage traversing the dispenser and the cooling liquid in the dispenser, and pre-cooling beverage entering the dispenser directly from the remote supply point by effecting a heat exchange between cooling liquid from the reserve supply and the beverage for a substantial distance during the travel of said beverage to the dispenser.

MICHAEL A. MARTIN.